(12) United States Patent
Poullard et al.

(10) Patent No.: US 10,262,522 B1
(45) Date of Patent: Apr. 16, 2019

(54) SOLAR POWERED EMERGENCY ALERT DEVICE

(71) Applicants: Keatha Poullard, Lake Charles, LA (US); Michael Poullard, Sr., Lake Charles, LA (US)

(72) Inventors: Keatha Poullard, Lake Charles, LA (US); Michael Poullard, Sr., Lake Charles, LA (US)

( * ) Notice: Subject to any disclaimer, the term of this patent is extended or adjusted under 35 U.S.C. 154(b) by 0 days.

(21) Appl. No.: 15/822,218

(22) Filed: Nov. 27, 2017

(51) Int. Cl.
*G08B 25/01* (2006.01)
*H02S 99/00* (2014.01)
*G08B 25/12* (2006.01)
*H02J 7/35* (2006.01)

(52) U.S. Cl.
CPC ........... *G08B 25/016* (2013.01); *G08B 25/12* (2013.01); *H02S 99/00* (2013.01); *H02J 7/35* (2013.01)

(58) Field of Classification Search
CPC ....... G08B 25/016; G08B 25/12; H02S 99/00; H02J 7/35
See application file for complete search history.

(56) References Cited

U.S. PATENT DOCUMENTS

| | | | |
|---|---|---|---|
| 2005/0249049 A1* | 11/2005 | Jarrett | G08B 15/004 368/250 |
| 2007/0143969 A1* | 6/2007 | Takamura | A44B 1/08 24/113 R |
| 2009/0223546 A1* | 9/2009 | Nazarian | A45B 3/04 135/66 |
| 2015/0165126 A1* | 6/2015 | Walsh | A61M 5/3129 604/506 |
| 2017/0038792 A1* | 2/2017 | Moore | A61B 5/02438 |

* cited by examiner

*Primary Examiner* — Leon Flores
(74) *Attorney, Agent, or Firm* — The Iwashko Law Firm, PLLC; Lev Ivan Gabriel Iwashko

(57) ABSTRACT

A solar powered emergency alert device, including a casing body, a button disposed on the casing body to be depressed by a user, and a printed circuit board (PCB) disposed within the casing body to generate and transmit a signal to a third party device in response to the depression of the button.

6 Claims, 1 Drawing Sheet

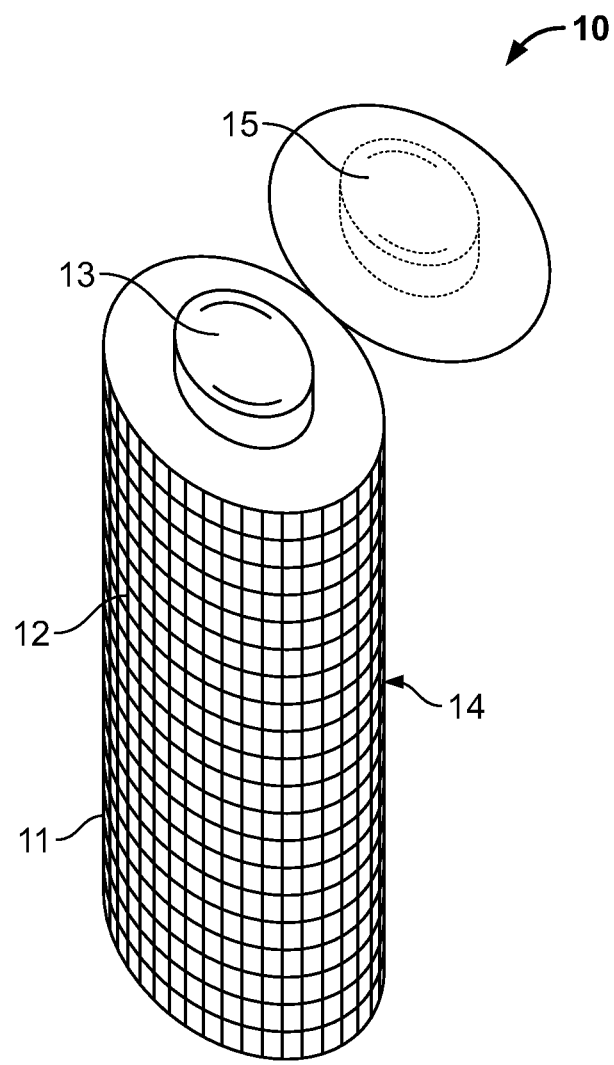

SOLAR POWERED EMERGENCY ALERT DEVICE

BACKGROUND OF THE INVENTION

1. Field of the Invention

The present general inventive concept relates generally to an emergency alert device, and more particularly, to a solar powered emergency alert device.

2. Description of the Related Art

Public safety is always a concern in modern society, and the emergence of fast-response emergency response teams is becoming more prevalent and required. For example, if a citizen is being robbed, then it would be in the citizen's best interest for police officers to be dispatched immediately to the citizen's location.

Current procedures of requesting help from authorities and/or emergency response teams involve dialing an emergency telephone number into a cell phone, and then verbally explaining the situation and giving a location. However, this enforced system may be ineffectual in situations where the citizen does not have access to a cell phone, cannot speak or does not know their location.

Therefore, there is a need for an emergency alert device that can alert emergency response teams that a user is in need of assistance.

There is also a need for an emergency alert device that is solar powered, so that it may never run out of battery power and/or never need to be connected to an electrical outlet for recharging.

SUMMARY

The present general inventive concept provides a solar powered emergency alert device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing A solar powered emergency alert device, including a casing body, a button disposed on the casing body to be depressed by a user, and a printed circuit board (PCB) disposed within the casing body to generate and transmit a signal to a third party device in response to the depression of the button.

The solar powered emergency alert device may further include a cap to optionally cover the button to prevent the user from depressing the button.

The solar powered emergency alert device may further include a solar panel disposed on at least a portion of the casing body to receive energy from the Sun and to provide power to the PCB based on the received energy.

The third party device may include an application running thereon to display a location of the solar powered emergency alert device on a map in response to the received signal.

The third party device may generate at least one of a noise, a vibration, and a visual signal to alert an emergency response team that the user is experiencing an emergency.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a solar powered emergency alert device, according to an exemplary embodiment of the present general inventive concept.

DETAILED DESCRIPTION OF THE INVENTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

FIG. 1 illustrates a solar powered emergency alert device 10, according to an exemplary embodiment of the present general inventive concept.

Referring to FIG. 1, the solar powered emergency alert device 10 may include a casing body 11, a solar panel 12, a button 13, a printed circuit board (PCB) 14, and a cap 15.

The casing body 11 may be made from metal, plastic, rubber, ceramic, or any other material known to one of ordinary skill in the art.

The casing body 11 may be of a size to be conveniently storable in a pocket or a purse of a user, and therefore, may be hand-held.

The solar panel 12 may be wrapped around and/or disposed on at least a portion of the casing body 11, and may receive, harness, and convert energy from the Sun into usable electricity that powers the solar powered emergency alert device 10. As such, a battery (not illustrated) within the solar powered emergency alert device 10 may store the energy harnessed from the Sun by the solar panel 12. Therefore, the solar panel 12 prevents the solar powered emergency alert device 10 from requiring new batteries or recharging.

The button 13 may be disposed at a top portion of the casing body 11, and may be depressed by the user during an emergency.

The PCB 14 may be disposed within the casing body 11, and may include a storage unit, a processor, a receiver, and a transceiver (not illustrated) to allow data to be stored within, received into, and transmitted from the solar powered emergency alert device 10. In detail, the PCB 14 may be configured to transmit information wirelessly through networks or the Internet, and may include communication capabilities such as BLUETOOTH, radio frequency identification (RFID), WIFI, 3G, 4G, satellite, etc., but is not limited thereto.

More specifically, when the user presses the button 13, the PCB 14 may generate and transmit a signal to at least one third party device, which may be possessed by local law enforcement, firefighters, paramedics, or any other type of emergency response teams. For example, if a user presses and holds the button 13, the signal could be routed to local paramedics, for at least the reason that a holding of the button 13 may signify that the user is experiencing a medical emergency. In contrast, if the user presses the button 13 three times, for example, the police may be summoned.

Also, the PCB 14 may transmit the signal to third party devices accessible by the user or any other users, such as family members of users. As such, if a family member of the user has an application corresponding to the solar powered emergency alert device 10 running on a mobile device of the family member, for example, the mobile device may ring to alert the family member that the user possessing the solar powered emergency alert device 10 needs assistance.

An application and/or website (that is usable and accessible on a computing device or mobile device) may be accessed and used in conjunction with the solar powered emergency alert device 10 in order to allow the user to program the solar powered emergency alert device 10 to allow the user to define how to manipulate the solar powered emergency alert device 10. In other words, users themselves may be able to program the solar powered emergency alert device 10 to change the types of emergency response teams that are summoned based on a particular number and/or type of button pushes.

The after the button 13 is depressed by the user, the PCB 14 may act as a beacon to allow emergency response teams to track a location of the user holding the solar powered emergency alert device 10. In other words, for example, the police may be able to track the location of the solar powered emergency alert device 10 on a corresponding website and/or application having a very detailed map displayed on a computer monitor and/or mobile device, along with a blinking dot on the map showing an exact location of the user (i.e., the solar powered emergency alert device 10). As such, when the button 13 is depressed by the user, the website and/or application may receive a signal from the solar powered emergency alert device 10 to show a location of the user holding the solar powered emergency alert device 10, and a signal may also be sent directly to an appropriate emergency response team (e.g., a database or computer system of the emergency response team) to alert the emergency response team that the button 13 has been depressed.

Alternatively, the emergency response teams may have devices that are directly linked with particular solar powered emergency alert devices 10, using serial numbers or other identifying features. For example, a third party device may generate at least one of a noise, a vibration, and a visual signal to alert and/or notify the emergency response team that the user is experiencing an emergency. As such, when the emergency response team receives a notification that a particular solar powered emergency alert device 10 has had its button 13 depressed, the devices of the emergency response teams may have GPS locators to locate the user holding the solar powered emergency alert device 10.

The cap 15 may be connected to the casing body 11 using a hinge or any other type of connection mechanism to cover the button 13 when closed. In other words, the cap 15 may be flippable to optionally expose the button 13, so that the button 13 does not get depressed accidentally.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A solar powered emergency alert device, comprising:
 a casing body;
 a button disposed on the casing body to be depressed by a user;
 a cap to optionally cover the button to prevent the user from depressing the button; and
 a printed circuit board (PCB) disposed within the casing body to generate and transmit a signal to a third party device in response to the depression of the button.

2. The solar powered emergency alert device of claim 1, further comprising:
 a solar panel disposed on at least a portion of the casing body to receive energy from the Sun and to provide power to the PCB based on the received energy.

3. A system, comprising:
 a solar powered emergency alert device, comprising:
  a casing body,
  a programmable button disposed on the casing body to be depressed by a user,
  a cap to optionally cover the button to prevent the user from depressing the button; and
  a printed circuit board (PCB) disposed within the casing body to generate a signal in response to the depression of the button; and
 a third party device to receive the generated signal from the solar powered emergency alert device and to process the signal.

4. The system of claim 3, wherein the third party device includes an application running thereon to display a location of the solar powered emergency alert device on a map in response to the received signal.

5. The system of claim 3, wherein the third party device generates at least one of a noise, a vibration, and a visual signal to alert an emergency response team that the user is experiencing an emergency.

6. The system of claim 3, wherein the signal received by the third party device indicates that the user is experiencing an emergency.

* * * * *